Jan. 30, 1934.  E. R. POSNACK  1,945,377
STAPLING MACHINE
Filed Oct. 25, 1933  5 Sheets-Sheet 2

INVENTOR
Emanuel R. Posnack

Jan. 30, 1934.　　　E. R. POSNACK　　　1,945,377
STAPLING MACHINE
Filed Oct. 25, 1933　　　5 Sheets-Sheet 3

INVENTOR
Emanuel R. Posnack

Jan. 30, 1934.  E. R. POSNACK  1,945,377
STAPLING MACHINE
Filed Oct. 25, 1933  5 Sheets-Sheet 4

INVENTOR
Emanuel R. Posnack

Jan. 30, 1934.     E. R. POSNACK     1,945,377
STAPLING MACHINE
Filed Oct. 25, 1933     5 Sheets-Sheet 5

INVENTOR
Emanuel R. Posnack

Patented Jan. 30, 1934

1,945,377

UNITED STATES PATENT OFFICE 1,945,377

STAPLING MACHINE

Emanuel R. Posnack, Brooklyn, N. Y., assignor of one-half to Charles B. Goodstein, Brooklyn, N. Y.

Application October 25, 1933. Serial No. 695,093

23 Claims. (Cl. 1—49)

This invention relates to a stapling or stitching machine for sealing cartons or containers made of corrugated board, card-board, fabrics and various other materials, and is particularly adapted to employ the staples and the method of driving same disclosed and claimed in Letters Patent Nos. 1,910,688 and 1,868,100 respectively, granted upon the application of Charles B. Goodstein; the main object of this invention being to enable an effective sealing of such containers by securing together adjacent flaps or walls thereof by a drive effected from one side only, without the use of any blade or anvil underlying the material or work being stapled.
The methods heretofore employed and which are now in common use for sealing cartons of corrugated board and the like, include the application of gummed paper to joints formed by adjacent edges of flaps, the pasting together of contiguous covers or flaps with silicate of soda or other mucilaginous substances, and the employment of automatic stitching machines adapted to drive a staple completely through two layers of material and against an underlying anvil or blade which is subsequently withdrawn after the completion of the stapling operation. Cartons sealed with gummed paper or mucilaginous means are readily subject to the danger of pilferage on account of the inherent weakness of the sealing material and the facility with which the adhesives used could be made to lose their effectiveness,— thereby rendering it comparatively easy to gain access to the shipping contents. In using the said automatic stitching machine, a more effective and stronger seal is obtainable than with adhesive means, but the design is relatively complicated due to the necessity of employing an underlying anvil and of withdrawing the anvil, a requirement which also limits the positioning of the staples to such an angle and location as will permit the said withdrawal of the anvil from its operative position within the carton. To overcome these deficiencies and disadvantages of the aforementioned commonly employed sealing methods, I have conceived this invention, which comprises a relatively simple device adapted to employ the staples and method constituting the said Goodstein inventions, whereby the use of an anvil or blade underlying the carton flaps is entirely obviated, thereby enabling the device to be operatively applied to any part of the carton for effectively driving staples in all directions and angles, and in all portions of the container, both on the inside thereof before shipping contents are placed therein, or on the outside after the cartons are packed.

Where machines using removable blades underlying the material are employed, the staples must penetrate both layers of the cover or flap, in order to contact with the underlying blade and be diverted upwardly for a clench. Such a process prevents the possibility of driving blind staples, that is, staples where the prongs do not penetrate through and below the lower layer of material, but merely enter into the body thereof. It is hence also to provide a method for producing blind stitching that I have conceived this invention, thereby enabling overlapping flaps or covers of cartons to be stapled without the danger of the prongs entering the interior of the carton to mutilate the contents thereof.

It is my opinion, from an investigation of the prior art, that never before has a machine been devised to cooperate with a staple in such manner that it will both drive it and control its clenching movement, from one side only of the material being stapled, and to so coact with the staple as to permit it to follow its own clenching tendency, without the use of independent, positive leg-deflecting means; and it is my belief that the device constituting my present invention is the first practical embodiment ever conceived of a machine for accomplishing the said result.

Attempts have been made to effect a stapling operation without the use of an underlying blade or anvil as hereinbefore referred to, such methods consisting of positive deflecting means for deliberately actuating the prongs inwardly towards each other, these means consisting of separate clenching members or special tools and dies adapted for independent operative movement to engage the prongs for such purpose. Such deflecting means contain elements which are necessarily relatively thin and delicate at the point of contact with the legs or prongs of the staple, and are intended to coordinate with the driving means for effecting an inward diversion of the legs by positive cooperating movements of these elements,—a structure which is not only intricate, but one which also contain elements that are readily subject to breakage. Furthermore, with such a design only a partial clench is possible, inasmuch as there is nothin to control the movement of the staple after it has entered the material; and also, a plowing through and mutilation of the material to be clenched is probable, due to the lateral movement of the legs or prongs while they were being diverted inwardly. My invention, however, is adapted to alter the shape of the top portion of the staple during the driving operation and at the same time enable a proper guiding or controlling of the stitch,—without the use of laterally moving tools or deflecting means,—during its progress into the material, to form a full and complete stitch, either blind or through, depending upon the predetermined dimensions of the staple, and also to permit the staple by its very shape to participate in the clenching operation. To accomplish this purpose, I employ a reciprocating driving plunger, coacting preferably with an oscillatory anvil placed over and upon the work, and, in the preferred form of my invention, with lateral abutments or confining means between which each staple moves as it is driven downwardly by the plunger, the distance between said abutments being not less than the greatest overall length of the unclenched staple,—thereby allowing the free clenching movement of the staple in accordance with its own tendency, and eliminating the danger of the legs being wedged between the plunger and any inwardly extending obstacle, such as a special deflecting tool. In other words, it is a purpose of this invention to effectively drive a self-clenching staple, of the type constituting the said Goodstein invention, under proper control or guidance, to produce an efficient clench, either blind or through as predetermined, without the use of any laterally moving parts for aiding in the clenching operation.

It is still another object of this invention to enable each of the legs of said self-clenching staple to penetrate the material at one point, and to allow said legs to continue through such points until the entire clenching operation shall have been completed,—thereby reducing the resistance offered by the material to the penetration of the staple, preventing a plowing through thereof, and obviating the danger of a collapse of the legs due to excessive resistance.

Another object of this invention is to enable the driven staple to contact with an anvil positioned upon the work, for receiving the impact of the driving blow, and to enable such an anvil to be automatically retracted so as to disengage the machine from the staple.

It is still another object of this invention to provide safety means whereby the device can only be actuated while the machine is in operative engagement with the work.

Another object is to provide simple manually operated driving means to effect a quick release of the plunger upon each manipulation of the operating lever for producing an efficient and sufficiently powerful operative stroke.

It is another object of this invention to provide shock-absorbing means to take up the impact of the plunger at the ultimate completion of its stroke. And it is a further object of this invention to enable easy access to be had to the constituent parts thereof for assembling and repairing purposes.

Other objects, features and advantages will appear from the drawings and the description hereinafter given.

Referring to the drawings.

In the drawings, the casing 15 contains in the front portion thereof the slots 16 within which the driving plunger 17 is adapted for slidable reciprocal movement. The bottom or driving portion 18 of the plunger is of reduced thickness and width, forming two shoulders 19 and 20 at its juncture with the upper portion thereof. The upper central portion of the plunger contains an opening 21, the top and bottom walls thereof being adapted for coaction with the operating portions of the peripheral surface of pawl 22, as will hereinafter be more fully described, said pawl being pivotally mounted at 23 at the inside end portion of the manually operated lever 24 which is pivotally mounted upon the shank of the bolt 25 extending through and supported by the lateral walls of the casing 15,—the lever being operatively movable within the aperture 26 in said casing intermediate the said lateral walls. The end of said pawl contains a hook 27 to which the end of spring 28 is secured, the other end of said spring being anchored to the screw 29 attached to the said casing. Flanking the said hole 21 in the plunger are two hook members 30 and 31, shown in the preferred embodiment of my invention as two prongs punched out of the body of the plunger. To these are attached the tops of the tension springs 32 and 33 the bottoms of which are secured respectively to the clips 34 and 35 mounted over and affixed to the cross piece 36 extending transversely across the front portion of the casing.

Extending transversely through and supported by the lateral walls of the casing is the shaft 37, provided with a head portion 38 adapted for rotary manipulation with a screw driver,—said head portion containing two diametrically opposite recesses 39 and 40 for accommodating the head portion of the adjacent screw 41 extending into the said casing in substantially parallel relationship to the said shaft 37. Rotatably mounted over said shaft 37 are two anvil actuators 42 and 43, each of said actuators containing two angularly disposed arms 44 and 45, and 46 and 47 respectively. The upper of said arms, namely 44 and 46, are substantially horizontally disposed and are in operative engagement with the said shoulders 19 and 20 respectively of the plunger, and the lower two said arms, namely 45 and 47, are substantially vertically disposed and are in operative engagement with the protruding ends 48 and 49 respectively of the pin 50 extending through and suitably secured to the anvil 51.

Mounted over the middle of said shaft 37 is the flat spiral spring 52, the inner end of which is attached to said shaft by the screw 53,—the other end of said spring being connected to the push or feed member 54 by being attached at 55 to the member 56 containing a bifurcated end portion through the hollow ears of which the pin 57 extends, said pin extending through and being in pivotal engagement with the looped extension 54a of the feed member. Mounted over the said shaft 37 between the said spring 52 and the anvil actuators 42 and 43 are the collars 58 and 59 containing the flanged portions 60 and 61, these collars serving as spacers between the spring and the anvil actuators and preventing lateral movement of the latter.

The feed member 54 is channel-like in structure, and is slidably mounted over the staple-carrying member or rail 62, the forward portion of which contains the parallel slots 63 and 64 for accommodating the exposed ends 48 and 49 of the pin 50 during the operative movement thereof,— the underside of said rail containing at the forward part thereof a slot 65 sufficiently wide to accommodate the top or body portion 66 of the anvil 51, said body portion 66 of the anvil (see Figures 3, 11, 12 and 13) extending through said slot 65 to join the base 67 of the anvil, the upper surface 68 thereof being adapted for slidable engagement with the undersurface of the plate 73. The said rail 62 has its open forward end closed by the wall 92, which is inserted between the inside lateral surfaces of said rail and held in place by screws operatively inserted into tapped holes 93, the said wall serving as an abutment for the anvil.

Figures 11, 13:
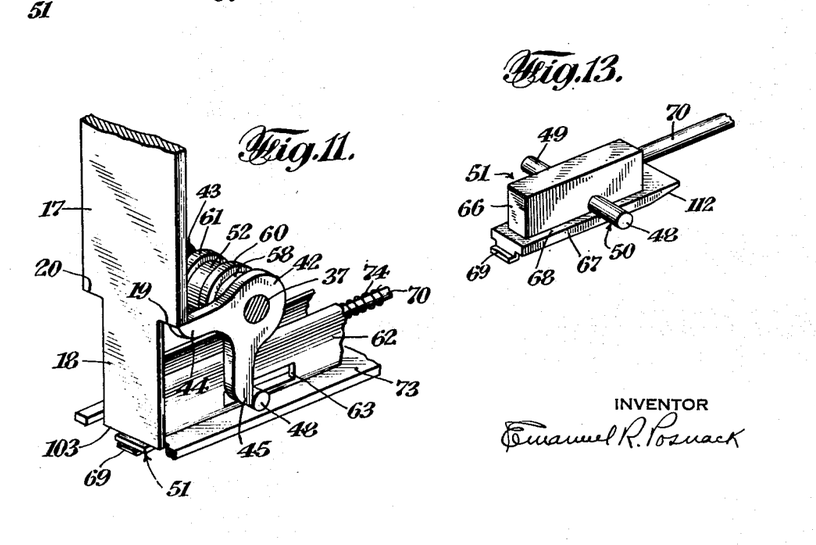
Figure 11 is a perspective of a fragment of the device showing the cooperative relationship between the plunger and the retractible anvil.
Figure 13 is a perspective of the retractible anvil proper.
Figure 17:
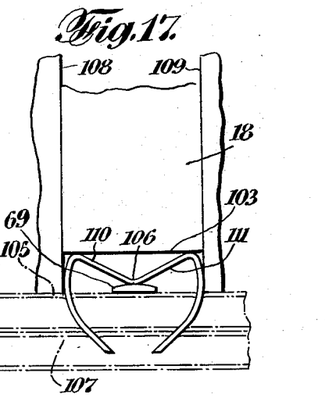

The forward portion of the anvil contains a tongue or lip 69 of sufficient length to accommodate the width of the staple adapted to be driven by the machine,—the said tongue being positioned directly below and in the path of the lower driving portion 18 of the plunger 17. In the preferred form of the lip 69, the upper surface is convexly curved, as shown in Figure 13 and more clearly in Figures 15, 16 and 17. The said anvil 51 is attached, preferably by threaded means, to the rod 70, the other end of the rod being slidably inserted within the recess 104 of the screw 71 which is in threaded engagement with the internally threaded boss 72 suitably attached to the base plate 73 of the machine. Mounted over the said shaft 70 is the helical spring 74, normally under compression to exert a forwardly directed force against the anvil. The rear end of the screw 71 contains a transverse slot 75 therein to accommodate the blade of a screw driver for adjustable manipulation, as will be hereinafter described.

Figures 1, 14:
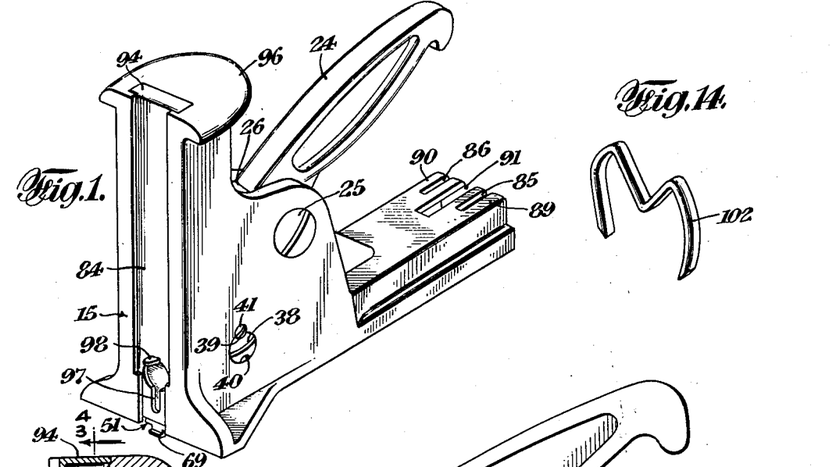
Figure 1 is a perspective view of the machine constituting my invention, showing it fully assembled.
Figure 14 on Sheet 1 is a perspective of the preferred form of staple employed in this device.
Figures 2, 7, 8:
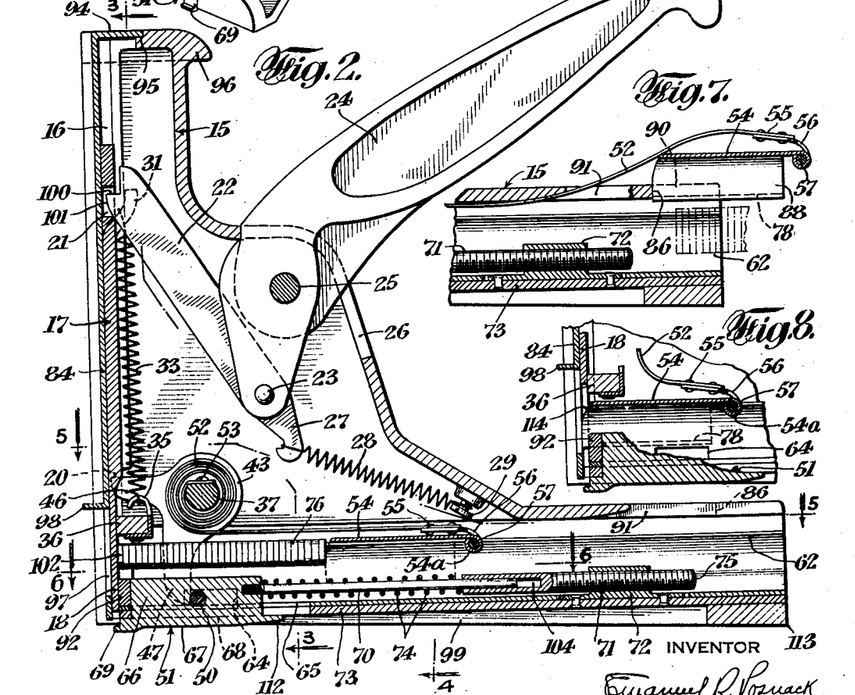
Figure 2 is a vertical cross-section of the machine, showing the parts in their normally inoperative position.
Figure 7 is a fragmentary sectional elevation illustrating the feed member in its inoperative position out of engagement with the staple rail, which is shown free to receive a new strip of staples.
Figure 8 is a fragmentary sectional elevation showing the position of the feed member against the front plate when there are no staples in the machine, the plunger being shown about to make a downward stroke.
Figure 3:
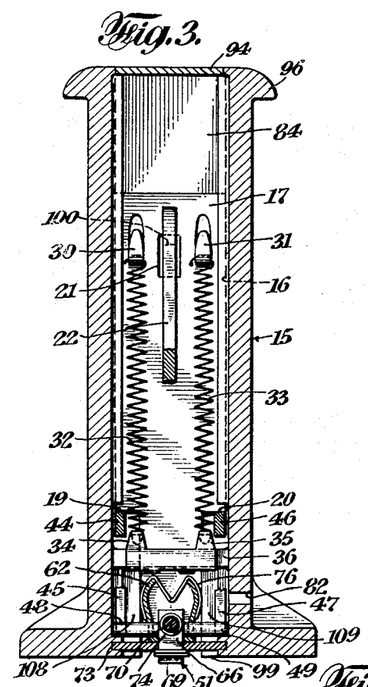
Figure 3 is a section of Figure 2 taken along line 3—3.
Figure 4:
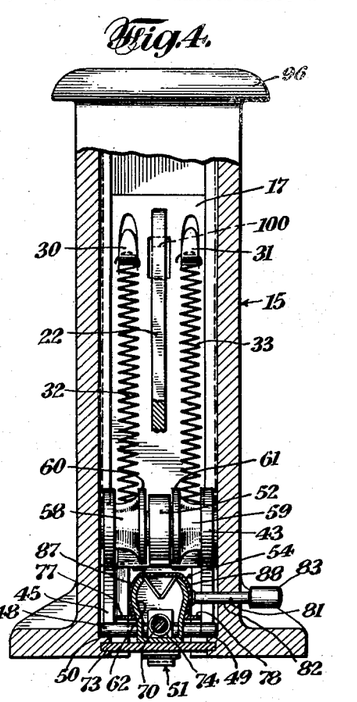
Figure 4 is a vertical section of Figure 2 taken along line 4—4.
Figure 5:
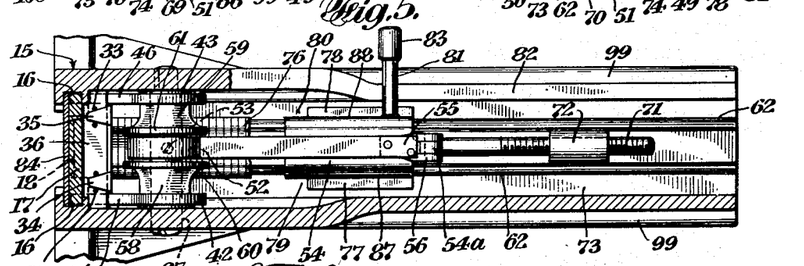
Figure 5 is a sectional plan of Figure 2 taken along line 5—5.
Figure 6:
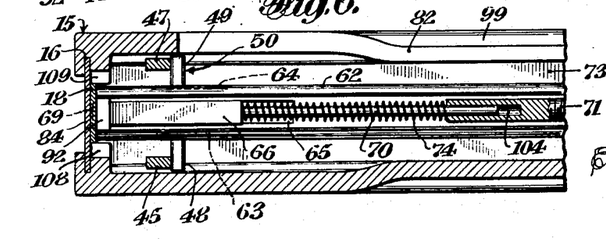
Figure 6 is a fragmentary sectional plan of Figure 2 taken along line 6—6.

The feed member 54 has the forward end thereof adapted for abutment with the last or rearmost staple in the strip of staples 76; said feed member being provided at the open bottom end thereof with two horizontally disposed flanges 77 and 78 extending along the length thereof almost to the front thereof, leaving recesses 79 and 80. Suitably secured to the feed member is the rod 81 extending transversely through the slot 82 running lengthwise along the bottom of one of the said lateral walls of the casing,—the end of said rod being provided with a knob 83 for manual manipulation. The top forward portion of the said feed member 54 is beveled rearwardly, thereby forming a space 114 between the top of said feed member and the front plate 84 when in abutment therewith (see Figure 8). The slots 85 and 86 in the upper rearward portion of the machine constituting the feed housing are adapted to accommodate the lateral walls 87 and 88 of the feed member when said member is in its inoperative position and out of engagement with the strip of staples (see Figure 7), the said flanges 77 and 78 underlying the horizontal walls 89 and 90 respectively to prevent an upward tilting of the feed member due to the pull of the spring 52. Inasmuch as the spring 52 exerts a pull in a forwardly direction, the front ends of the lateral walls 87 and 88 of the feed member or follower 54 will bear up against the front walls of the slots 85 and 86 with sufficient pressure to prevent a downward movement or dropping of the forward end of the said follower. The thickness of the front walls of slots 85 and 86 are made sufficiently great to create enough frictional resistance at both of said walls to offset the counter-clockwise turning tendency of the follower about the rearmost corners of walls 89 and 90. The slot 91 is adapted to accommodate said spring 52 when the feed member is in its said inoperative position.

The said front plate 84 is slidably inserted within suitable grooves in the front walls of the casing 15, the upper portion of said front plate having a flange 94 bent rearwardly at right angles thereto and adapted to fit into a recess 95 at the top or knob portion 96 of the machine. The front plate is provided near the bottom thereof with a through slot 97, the upper expanded portion of which is substantially circular and communicates with a slit extending downwardly in longitudinal direction, the said expanded portion of said slot being positioned directly above the rail 62 and covering an area sufficiently great to permit the removal of a staple therefrom. Above said slot 97 is an outwardly extending lip 98 adapted for manual manipulation to slidably move the plate 84 in an upwardly direction. The base plate 73 is slidably positioned within suitable grooves in the base of the casing. The said base is provided with two tapering, longitudinally extending rails or props 99 which are adapted to rest upon the material being stapled,—the plane of the plunger and the bottom surface of said longitudinal rails 99 forming an obtuse angle.

Figures 9, 10, 12:
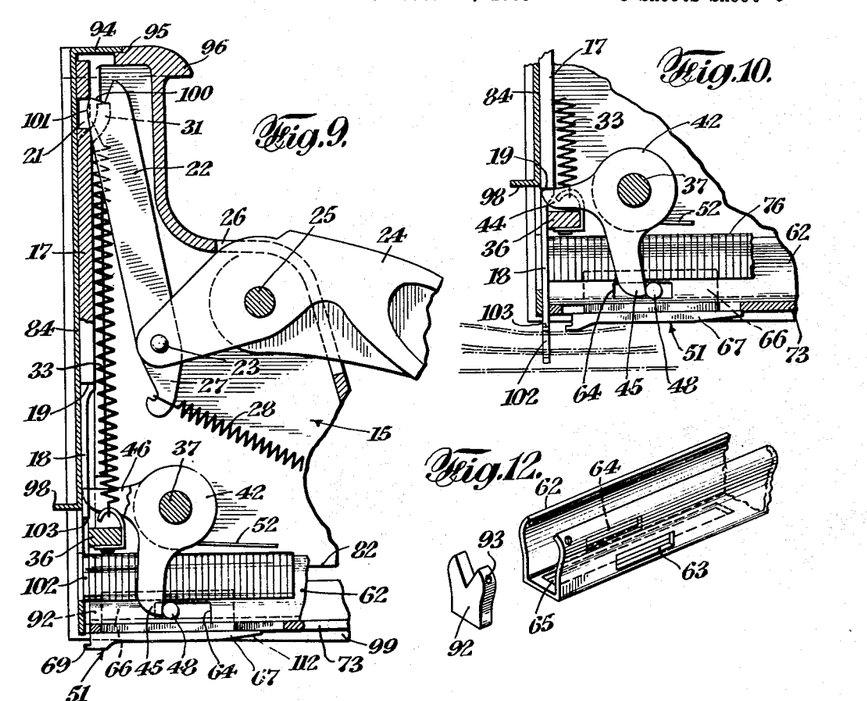
Figure 9 is a fragmentary vertical section of the machine showing the position of the parts thereof at the point where the plunger is about to be released for its downward operative stroke.
Figure 10 is a section showing the position of the parts with the plunger in its extreme downward and projected position at the completion of its operating stroke, the stitch being shown driven into the material, represented by dot-dash lines.
Figure 12 is a detached fragmentary perspective of the staple rail and front wall therefor.

In the operation of this device, the machine is placed directly upon the work or the carton to be sealed, and then the lever 24 is depressed, thereby causing the pawl 22 to move upwardly against the action of spring 28, the horizontally disposed surface 100 of the pawl engaging the upper wall of the opening 21 to slidably actuate the plunger 17 upwardly against the action of springs 32 and 33. During the said movement of the parts, the pawl will be pivotally swung in a clockwise direction, due partly to the cam surface 101 of the pawl engaging the inner wall of the plunger at the lower edge of the hole 21 and thus pushing the pawl out; and this clockwise movement continues until the pawl reaches its maximum upward position as illustrated in Figure 9, the parts being so designed that the continued operative movement of lever 24 will cause the operative surface 100 of the pawl to move out of engagement with the said upper wall of the opening 21, thereby releasing the plunger and resulting in a swift downward stroke thereof under the action of the said springs 32 and 33. Inasmuch as the first or foremost staple 102 is in abutment with the inner surface of the front plate 84, due to the pressure of the feed member 54 against the strip of staples 76, and as the said staple 102 is directly in the path of travel of the plunger, the bottom or operating surface 103 of said plunger will, during the course of its power stroke, engage the top of said staple and shear it from the adhesive material attaching it to the said strip of staples, carrying it downwardly until it engages the material to be stapled, the completion of the stroke resulting in a clench of the staple as will hereinafter be more fully described.

During the said downward or power stroke of the plunger, the shoulders 19 and 20 of the plunger come into engagement with the arms 44 and 46 of the anvil actuators 42 and 43 respectively, thereby causing a counter-clockwise rotation thereof to cause the lower arms 45 and 47, which are in engagement with the protruding portions 48 and 49 of the pin 50 in the anvil, to actuate the anvil rearwardly against the action of spring 74,—the rod 70 slidably moving within the adjacent recess 104 within the body of the screw 71. Upon the completion of the operating stroke of the plunger, the said spring 74 will urge the anvil back to its normal position against the action of the springs 32 and 33; and the spring 28 will return the lever 24 and the pawl back to their original positions.

Figures 18, 19:
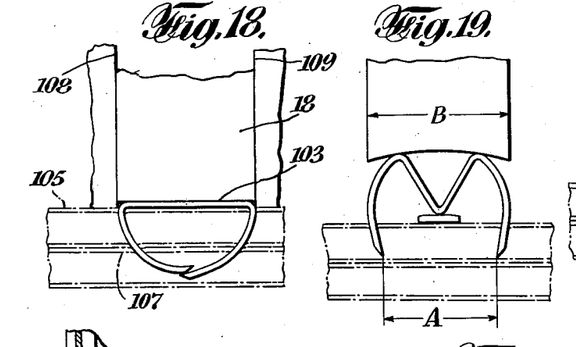
Figures 19, 20 and 21 represent the relative positions of plunger, staple, anvil and material being stapled, using a plunger with a concave impact surface.

By referring to Figures 15, 16, 17 and 18, it will be seen that the staple 102, under the action of the plunger, moves downwardly until the points of the prongs contact with the material being stapled, the continued downward pressure of the plunger causing the prongs to puncture the top layer 105 of the material being stapled and move downwardly in a substantially arcuate path through the holes so formed until the lowermost point of the intermediate connecting portion between the prongs, shown as the apex 106 of the intermediate V portion, strikes the lip 69 of the anvil,—the further downward movement of the plunger reshaping the top portion of the staple to increase and widen the angle of the V,—the prongs of the staple entering the lower layer 107 in a substantially arcuate path. Preferably just before the top of the staple is fully flattened, the anvil is withdrawn rearwardly by the arms of the anvil actuators 42 and 43 coacting with the shoulders 19 and 20 of the plunger, as above described, the operative movement of the plunger continuing until the top of the staple is fully flattened and the prongs completely clenched as shown in Figure 18.

The lateral walls 108 and 109 serve as restrictions against a lateral spreading of the prongs during their clenching movement, and tend to confine said prongs within their natural substantially arcuate path which they must of necessity follow due to the fact that the arms 110 and 111 of the intermediate connecting portion constitute substantially fixed radii, the said arched prongs constituting portions of the circumference of the circle of which the center is 106. It thus appears that the plunger coacts with the staple proper to cause it to penetrate the material, and, during the process of flattening out and reshaping the upper portion of the staple, permitting the legs or prongs to move unrestrainedly through the material in accordance with their own tendencies, and clench therein. Should the wire of which the staple is composed be of relatively weak material or small dimensions, the lateral restrictions 108 and 109 will aid in guiding and controlling the movement of the prongs and in preventing a lateral spreading thereof. It will be noted that the distance between these lateral walls 108 and 109 is never less than the overall length of the staple no part of such walls extending inwardly to interfere with the downward movement of the plunger or to cause a wedging of the legs between the walls and the plunger, nor do these lateral walls contain inwardly movable elements to cause a deliberate deflection of the legs or prongs,—the said lateral walls serving as a limiting means rather than a deliberate deflecting means.

Although the clenched staple is shown with the prongs finally positioned within the lower layer 107 of the material to form a stitch blind on the underside, it is of course obvious that by lengthening the arms 110 and 111 and the prongs, or changing the general design of the staple, a through stitch or one that will penetrate the lowermost layer can be obtained.

The timing of the action of the anvil is predetermined, and by proper designing and dimensioning of the arms 44, 45, 46 and 47, or by varying the relative positions of the shoulders 19 and 20, the anvil actuators 42 and 43, and the pin 50, the time of retraction can be advanced or retarded accordingly. In other words, such timing can be effected as will permit the anvil to be withdrawn either after the top portion of the staple is completely flattened, or at any point of the clenching operation therebefore,—the preferred retraction occurring just before the completion of the stroke.

It should also be noted that with the use of the preferred anvil lip 69, which is rigid and unyielding, there will be sufficient support for the staple during its clenching operation,—the lip of the anvil offering sufficient resistance against the action of the plunger to obviate the danger of mutilating the material by the impact of the apex 106,—which might occur without the presence of such an anvil. Inasmuch as the anvil is relatively thin and as the material to be stapled is generally corrugated board or similar yieldable and compressible material, the interposition of the anvil will not in any way affect the completeness of clench. When the anvil is withdrawn prior to the flattening of the top of the staple, as occurs with the preferred timing of retraction, the impact of the staple against the anvil will have already taken place, and the continued operative movement of the plunger will not cause a mutilation of the material by the engagement of the apex 106 therewith after the anvil is withdrawn.

When the machine is in position against the work, the resiliency and yieldability of the staple and the underlying material will permit of a yieldable impact of the plunger, relieving the machine of any sudden shock which might otherwise occur particularly when the machine is operated in the air without being provided with shock-absorbing means. It will also be noted, however, that during the downward operative movement of the parts as above described, the plunger comes into engagement with the anvil actuators, causing a consequent compression of the spring 74, and that this spring hence also serves the purpose of a shock absorber when the machine is not positioned on the work, inasmuch as the plunger is yieldably retarded at the ultimate completion of the stroke due to the action of this spring. It should also be observed that the differential between the respective forces of the springs 32 and 33 and the spring 74 can be adjusted by manipulating the screw 71 by the blade of a screw driver inserted within the slot 75, for varying the amount of compression in spring 74 and effecting the most efficient operative relationship of the parts.

The rearmost portion 112 of the bottom of the anvil is slightly bevelled, the purpose of which is to reduce the frictional resistance due to the movement of the anvil against the material, and thereby ease the retraction of the anvil.

The rails or props 99 extending longitudinally along the base are tapered slightly to cause an elevation of the rear of the machine and a slight tilt thereof in a forwardly direction, thereby causing the prongs to enter at a slight angle to effect better penetration thereof into the material being stapled, and also reducing the tendency to tilt the entire machine backwardly in a clockwise direction about the corner 113 (see Figure 2) during the downward stroke of the lever 24.

The entire strip 76 of staples is constantly urged forwardly by the feed mechanism described, and when the plunger is raised during the operative cycle of the machine and it clears the strip of staples, the first or foremost stitch will be forced against the said front plate 84 and yieldably held there. Should it be desired to increase the yieldable push of the feed member against the strip of staples, the screw 38 can be manipulated with a screw driver in a rotary direction to cause either an increase or a reduction in tension of the spring 52, the said screw being held locked in position by the set screw 41 engaging either of the recesses 39 or 40. Should there be no staples in the machine whatsoever, the forward end of the feed member 54 will abut against the front plate, but inasmuch as the top front portion of said feed member is bevelled away, the plunger, on its downward operative movement, will wedge itself into the space 114 between the feed member and front plate and force the said member rearwardly without any danger of crushing or mutilating it.

In the event a staple for some reason or other becomes clogged in the plunger chamber, the insertion of a screw driver or other implement into the slot 97 will enable the clogged staple to be moved upwardly until it reaches the expanded portion of said slot, from whence it may be easily and readily withdrawn. Should it be desired to gain access to the interior of the device, the front plate 84 can easily be raised by lifting the lip 98 to slidably move the entire front plate out of the machine. Inasmuch as the bottom plate is also slidably held in position, it can easily be slidably removed by pulling it out rearwardly.

The knob 96 at the top of the machine is adapted for convenient grasping by one hand, the other hand applying operative pressure to the lever. This arrangement enables a direct downward pressure to be brought upon the work; and further makes it possible for the entire machine to be placed not only upon a closed carton but within the interior of a carton to staple the bottom flaps together.

Figure 20:
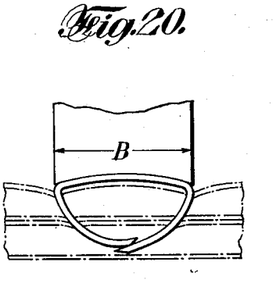
Figures 21, 22:
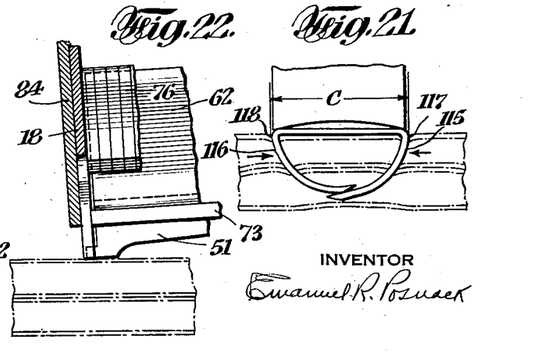
Figure 22 is a fragmentary view of a form of my invention illustrating the staple being driven into the material at an angle.

The bottom driving surface of the plunger need not necessarily be flat but may be concavely shaped as shown in Figures 19, 20 and 21. Such a design, when applied to relatively tough material, such as fiber board, is adapted to produce a more complete clench, particularly with a staple designed as shown in the last mentioned figures of the drawings,—the distance A between the prongs in the normal unclenched position thereof being less than the width B of the plunger, and less than the straight line linear length C of the top connecting portion. During the downward movement of the staple, the prongs will encounter increasing resistance up to the point of maximum spread (width C), thereby compressing the outer walls 117 and 118 of the holes caused by the initial penetration of the prongs, and thereby enlarging these holes. Upon a continued downward movement of the staple beyond the point of maximum spread, the outward lateral pressure of the prongs against the walls will ease up, permitting the said holes to contract somewhat due to the elasticity of the said relatively tough material being stapled. Upon the completion of the downward stroke of the plunger, the staple will assume the shape as shown in Figure 20, the top portion thereof being slightly bowed or convex. After the plunger is removed as shown in Figure 21, the top of the staple, due to its natural resiliency, will tend to straighten out from its bow shape, until its length C is greater than the length B before this straightening-out process. This will cause the outer lateral surfaces 115 and 116 of the prongs to again exert outward pressure against the outer walls 117 and 118,—the resistance of said walls 117 and 118 causing an inward pressure against said sides 115 and 116, as shown by the arrows in Figure 21, with a resultant inward deflection of the legs and a greater clenching.

Figures 15, 16:
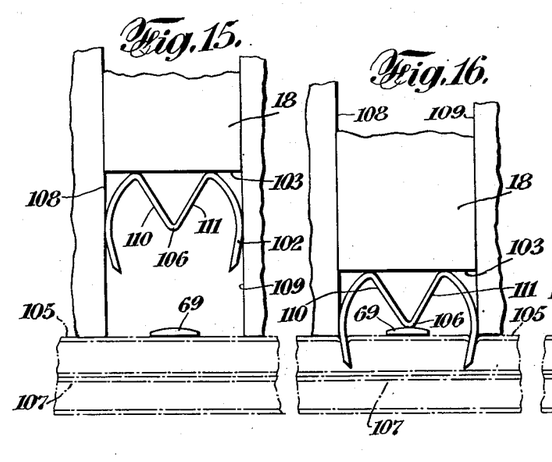
Figures 15, 16, 17 and 18 illustrate the relative positions of plunger, staple, anvil and material being stapled, during a complete stroke or clenching cycle.

It will be noted that the preferred form of staple shown in the drawings, particularly as illustrated in unclenched form in Figures 15 and 19, comprises two prongs and a connecting portion having intermediate the prongs an indenture preferably in the form of a V, the prongs being substantially arcuate in form and having their lower ends or terminal portions straight and uncurved. This design has the advantage of permitting the said straight terminal portions to enter the material, during the initial penetration thereof, in an almost vertical direction, without the danger of collapsing or bending as might occur if the terminals were arched. Thus the puncturing of the upper surface of the material is readily accomplished, providing the holes through which the remaining portions of the prongs enter in the process of forming a clench.

Reference to Figure 22 will show the machine so designed that a staple is driven in at an angle, thereby causing a shearing effect to be produced and resulting in an easier penetration of the staple, without the necessity of forming the prongs with points thereon.

Figure 23:
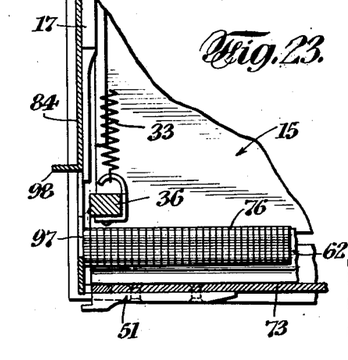
Figure 23 is a fragmentary sectional view of an arrangement having a stationary non-retractible anvil.

Although the preferred embodiment of this invention contains a retractible anvil, this invention is not necessarily limited to such a construction, inasmuch as the stationary anvil shown in Figure 23 can be employed,—the anvil being disengaged by a withdrawing of the entire machine by the operator after the completion of the clenching operation.

Figure 24:
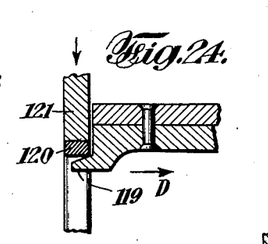
Figure 24 is a fragmentary view of a form of my invention showing a bevelled stationary anvil against which a staple is being driven to cause a rearward movement and consequent disengagement of the anvil and the attached machine from the staple.

Figure 24 illustrates another form of stationary anvil, the lip 119 having the upper surface thereof bevelled so that the staple 120, upon contacting therewith under the influence of the plunger 121, will cause a rearward push in the direction of the arrow D,—there being a component force in that direction. In this manner, the entire machine will be disengaged from the staple.

Figure 25:
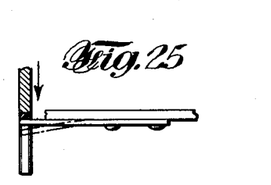
Figure 25 is a diagrammatic view of a modification showing an anvil made of a spring blade.

Figure 25 illustrates still another arrangement, showing a thin flat anvil made of resilient or spring material, so that upon the downward stroke of the plunger, the anvil will, under the action of the plunger, yieldably move downwardly to compress the material and enter the depression formed thereby. Inasmuch as this anvil can be made of very thin material, the resultant stitch will have the top portion thereof perfectly flat against the material, without the presence of a space between the underside of the top portion of the stitch and the material. With this form of anvil, which is preferably not rearwardly retractible, the machine must be manually disengaged from the work,—the anvil returning to its normal position against the base.

Figure 26:
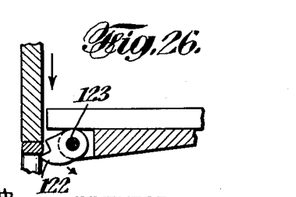
Figure 26 illustrates another modification showing a pivotally mounted anvil.

Another form of anvil is shown in Figure 26, where the anvil 122 is pivotally mounted at 123, the downward stroke of the plunger causing a counter-clockwise pivotal movement and consequent retraction of the anvil until it clears the stitch and is disengaged therefrom. This design eliminates the use of the reciprocatory anvil of the preferred form of my invention hereinbefore described.

Figure 27:
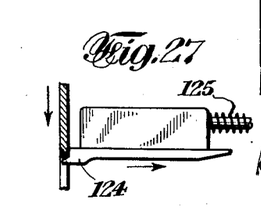
Figure 27 illustrates an anvil similar to that disclosed in Figure 24, but movable rearwardly against the action of a spring.

In Figure 27 is shown an anvil 124 having the upper portion of the lip thereof bevelled similarly to that shown in Figure 24. In this design, however, the anvil is not immovably affixed to the machine, but is movable longitudinally against the action of the spring 125 which normally exerts a pressure thereupon in a forwardly direction. The operative stroke of the plunger will cause the anvil to move rearwardly to disengage it from the staple; and thereafter the anvil will be urged back into its normal position by the action of the spring 125.

Figure 28:
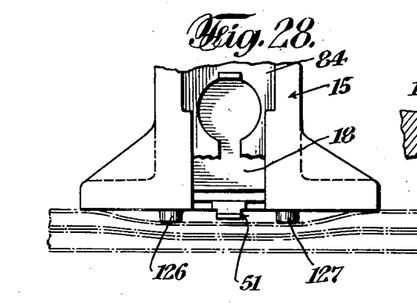
Figure 28 is a fragmentary front view of the machine provided with two props or protruding elements on the underside of the machine to permit the unrestrained retraction of the anvil.

In Figure 28 are shown two props or protruding elements 126 and 127 on the underside of the machine. When the machine is placed upon the work, these props will cause a depression of the material as shown in the figure, thereby removing the anvil from actual contact or engagement with the work. In this manner the frictional resistance offered by the material to the rearward movement of the anvil is eliminated, thus permitting an unrestrained retraction thereof. It is of course understood that the height of these props with respect to the anvil is such that the distance of the anvil above the material will be sufficiently small to permit of a proper clenching operation,—the base of the anvil just clearing the upper surface of the material.

Figure 29:
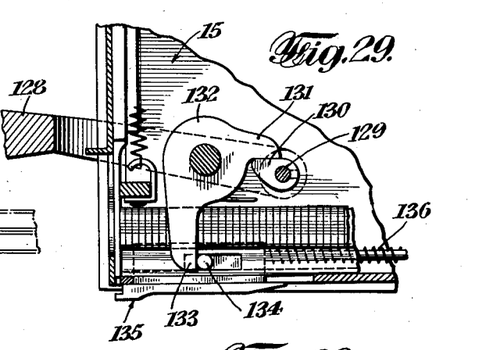
Figure 29 is a fragmentary side section of another form of my invention showing a means of retracting the anvil by the manipulation of a front handle.

In Figure 29 is shown another method of retracting the anvil. Upon the completion of the operating stroke of the plunger, the forwardly extending handle 128 is raised during the process of lifting the machine from the work. Inasmuch as this handle is pivotally mounted over the shaft 129 to which the cam 130 is keyed, this upward movement will result in a clockwise rotation of the cam to cause the working surface thereof to engage the arm 131 of the anvil actuator 132, thereby causing a counter-clockwise rotation of said actuator and a consequent operative engagement of the arm 133 with the pin 134 of the anvil 135 to produce a retraction of the anvil against the action of spring 136, and a disengagement of the lip of the anvil from the staple. When the machine is again placed upon the work, a downward pressure must be applied upon the handle 128 during the operation of this device, releasing the anvil actuator 132 from the pressure exerted thereupon by the cam 130, thereby permitting the spring 136 to actuate the anvil back into its normal forward position.

Figure 30:
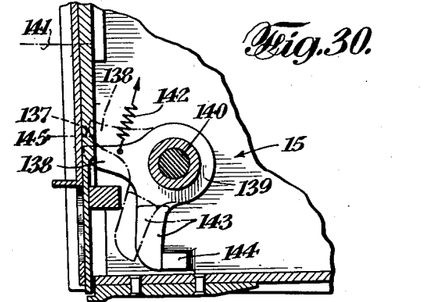
Figure 30 is still another form of this invention illustrating a method of disengaging the machine from the work by the impact of a weight projected against a protruding element integral with the machine.

Figure 30 illustrates another form of my invention for disengaging the machine from the work. The plunger contains the shoulders 137 (only one of which is shown in the drawings), these shoulders being adapted to engage the arms 138 of the members 139 rotatably mounted on the shaft 140. The shoulders in their uppermost position are at the level 141, and the member 139 is normally in the position shown by the dot-dash lines in the figure, being held there by the upward pull of the spring 142. During the downward stroke of the plunger, said shoulders strike the arms 138, the impact being sufficient to cause the arm or weight 143 to strike the abutment 144 shown integral with the body of the machine. The force of impact is sufficiently great to cause the entire machine to move rearwardly and out of engagement with the work. It should be noted that in this design the spring 142 is light in action, being capable of exerting just enough upward force to rotatably carry the members 139 into their normal inoperative positions. It should further be noted that the final position of the said shoulders is at the level 145.

Figure 31:
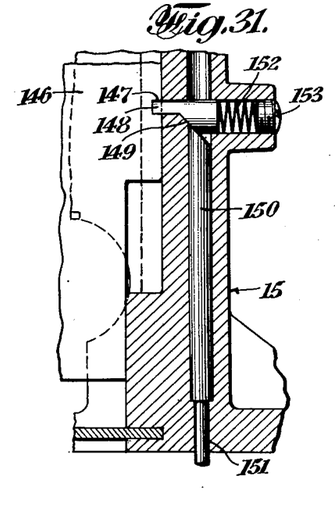
Figure 31 is a partial front sectional view of the machine, showing, as an addition, a safety lock for holding the plunger against movement when the machine is not in operative engagement with the work.
Figure 32:
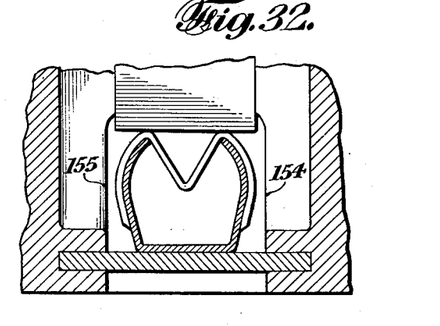
Figure 32 is a partial front view of a form of the machine constituting my invention without any lateral abutments, the lateral walls in the plunger chamber being remote from the legs of the staple.

In order to obviate the possibility of operating the machine while not in actual engagement with the work, and thus render it safe to handle and also reduce the indiscriminate waste of staples, the locking device shown in Figure 31 is employed. The plunger 146 contains a recess 147 in a side thereof adapted to operatively receive the lock 148 therein,—said lock containing a bevelled surface 149 adapted for operative engagement with the upper bevelled surface of the vertically movable rod 150. The bottom of said rod contains a portion 151 which extends downwardly through and protrudes from the base of the machine. When the machine is operatively placed upon the work, the rod 151 will be pushed upwardly until the bottom thereof is flush with the base,—the upper bevelled surface of rod 150 slidably and frictionally engaging surface 140 to actuate it to the right against the action of spring 152, thereby bringing the lock 148 out of engagement with the recess 147 and permitting the plunger 146 freedom of action. It will be noted that the screw 153 can be adjustably manipulated to vary the tension of the spring acting against lock 148.

Where the staple is made of material sufficiently rigid and strong structurally, or is sturdily dimensioned, it may not be necessary to use lateral walls to serve as restrictions or abutments to the prongs of the staple while it is being driven downwardly, as the prongs will penetrate the work without the danger of collapsing or spreading even in the absence of lateral abutments. Such a condition is illustrated in Figure 32 which shows the lateral walls 154 and 155 removed from and out of engagement with the prongs of the staple, so that the plunger and staple alone cooperate with each other to effect a complete stapling operation,—the plunger supplying the necessary driving force, and the shape of the staple being such that during the flattening of the top portion thereof the prongs will follow their natural tendency to clench in a substantially arcuate path.

Although the machine hereinbefore described and the modifications thereof have been illustrated as employing a staple with a V-shaped intermediate connecting portion, the machine constituting my invention is equally adaptable to employ a staple with a U-shaped intermediate portion or one containing other forms of indentures.

It is also understood that my invention is not limited to the forms as hereinbefore illustrated and described, as other mechanical embodiments thereof may be employed within the scope of the appended claims.

What I claim is:

1. In a stapling machine for driving a staple with substantially arcuate prongs and an intermediate connecting portion shaped to extend out of the plane of its junctures with said prongs, the combination of a plunger, a hand operable lever, means coacting with said plunger and lever for reciprocally actuating the plunger by manual manipulation of the lever, lateral guiding walls bounding the said staple during its operating cycle under the driving action of the plunger, the distance between said walls being no less than the maximum overall length of the unclenched staple, the base of the machine having an opening underlying the line of travel of the plunger and adapted to permit the plunger to project therethrough at the completion of its power stroke, an anvil associated with the base and extending across said opening and adapted for positioning over the material being stapled when the machine is in operative engagement with said material, said plunger being adapted to drive the staple towards the material to cause the prongs to puncture the upper surface thereof and the said intermediate connecting portion to strike said anvil, the continued operative movement of the plunger reshaping and flattening said connecting portion of the staple against the anvil and simultaneously causing each of the prongs to move further into the material through the holes caused by said puncturing, the said walls holding the prongs against outward lateral movement; and means for disengaging the anvil from its position between the material and the staple.

2. In a stapling machine for driving a staple with substantially arcuate prongs and an intermediate connecting portion shaped to extend out of the plane of its junctures with said prongs, the combination of a plunger, a hand operable lever, means coacting with said plunger and lever for reciprocally actuating the plunger by manual manipulation of the lever, a retractible anvil associated with the base of the machine and normally underlying and positioned in the line of travel of the plunger and adapted to be positioned over the material being stapled when the machine is in operative engagement with said material, means coacting with said plunger and anvil for retracting the latter from said normal position at a predetermined point during the operating cycle of the plunger, said plunger being adapted to drive the staple towards the material to cause the prongs to penetrate the upper layer thereof and the said intermediate connecting portion to strike the anvil while in its said normal position, the continued operative movement of the plunger reshaping and flattening said connecting portion against the anvil and simultaneously causing the prongs to move further into the material in accordance with their own tendencies.

3. In a stapling machine, the combination of plunger for driving a staple, yieldable means adapted to actuate said plunger against the staple in the direction of its power stroke, a pawl operatively engageable with said plunger and adapted to actuate it against the action of said yieldable means, said pawl having thereon a cam surface engageable with a lateral wall of the plunger, the contour of said surface being such as to cause a retraction of the pawl from the plunger and a disengagement therefrom at a predetermined point to allow said yieldable means to operatively actuate said plunger.

4. In a stapling machine, the combination of a plunger for driving a staple having an aperture therein, spring means flanking said aperture and adapted to actuate said plunger against the staple in the direction of its power stroke, a pivotally mounted pawl having an extremity thereof operatively engageable with a wall of said aperture, means to actuate said pawl and plunger against the action of said spring means, said pawl having thereon a cam surface engageable with a lateral wall of the plunger, the contour of said surface being such as to cause a gradual pivotal retraction of the pawl from the plunger during the operative engagement of the pawl therewith and a disengagement therefrom at a predetermined point to allow said spring means to operatively actuate said plunger.

5. In a stapling machine, the combination of a plunger for driving a staple, said staple being characterized by having two substantially arcuate prongs and a connecting portion with an indenture intermediate said prongs, an anvil underlying said staple and positioned in the line of travel of said plunger and adapted to overlie the work to be stapled, spring means attached to said plunger and anchored to the frame of said machine and adapted to actuate said plunger in the direction of its power stroke, an abutment wall on said plunger, a pivotally mounted pawl operatively engageable with said wall, means to actuate said pawl and plunger against the action of said spring means, said pawl having thereon a cam surface engageable with a side of the plunger, the contour of said surface being such as to cause a pivotal retraction of the pawl from the plunger and a disengagement therefrom at a predetermined point to allow said spring means to operatively actuate said plunger, and yieldable means to return the pawl to its original position; said plunger being adapted, during said power stroke, to drive the staple towards the work to cause the lowermost portion of said indenture to strike the anvil and said connecting portion to become flattened thereupon, simultaneously causing the prongs to enter the work and freely move therein in accordance with their own tendencies.

6. In a stapling machine, the combination of a plunger for driving a staple, spring means adapted to operatively actuate said plunger against the staple, anchoring elements integral with the plunger and comprising prongs forced out from the body of the plunger, said spring means being anchored to said prongs and to the framework of the machine, a pawl operatively engageable with said plunger and adapted to actuate it against the action of said spring means, said pawl having thereon a cam surface engageable with a lateral wall of the plunger, the contour of said surface being such as to cause a retraction of the pawl from the plunger during its operative engagement therewith and a disengagement therefrom at a predetermined point to allow said spring means to operatively actuate the plunger; a hand operable lever pivotally connected to said pawl; and single spring means anchored to the framework of the machine and attached to said pawl for yieldably urging said pawl and lever back to their normal inoperative positions.

7. In a stapling machine, the combination of a plunger, means to reciprocally actuate the plunger for operative engagement with a staple having substantially arcuate prongs and a connecting portion with an indenture intermediate the prongs, a retractible anvil adapted in its normal operative position to underlie the plunger and overlie the material being stapled, yieldable means in operative engagement with said anvil for normally holding it in its said operative position, means for retracting the anvil from its said operative position against the action of said yieldable means, the plunger being adapted to drive the staple towards the material to cause the said indenture to strike the anvil and said connecting portion to become flattened thereupon while the anvil is in its operative position, simultaneously causing the prongs to enter the material on either side of the anvil.

8. In a stapling machine, the combination of a plunger, means to reciprocally actuate the plunger for operative engagement with a suitably positioned staple, a retractible anvil adapted in its normal operative position to underlie the plunger and overlie the material being stapled, yieldable means in operative engagement with said anvil for normally holding it in its said operative position, rotatably mounted anvil actuating means operatively engageable with said plunger and said anvil and adapted to be actuated by the plunger at a predetermined point for retracting the anvil against the action of said yieldable means; the plunger being adapted to drive the staple towards the material to cause it to strike the anvil while it is in its operative position, simultaneously causing the prongs to enter the material on either side of the anvil.

9. In a stapling machine, the combination of a plunger, means to reciprocally actuate the plunger for operative engagement with a suitably positioned staple, a retractible anvil adapted in its normal operative position to underlie the plunger and overlie the material being stapled, yieldable means in operative engagement with said anvil for normally holding it in its said operative position, and two rotatably mounted anvil actuators each containing two angularly disposed arms thereon; the said plunger having its lower portion of reduced width to form two shoulders at the juncture of the lower and upper portions thereof, said shoulders being engageable with the upper two of said arms, the other two arms being operatively engageable with said anvil; the said shoulders of the plunger during the operative stroke thereof being adapted to engage said upper arms to cause a rotation of the anvil actuators and a consequent operative engagement and retraction of the anvil by said other two arms against the action of said yieldable means; the plunger being adapted to drive the staple towards the material to cause it to strike the anvil while it is in its operative position, simultaneously causing the prongs to enter the material on either side of the anvil.

10. In a stapling machine, the combination of a plunger, means to reciprocally actuate the plunger for operative engagement with a suitably positioned staple, a retractible anvil adapted in its normal operative position to underlie the plunger and overlie the material being stapled, a rod attached to said anvil, a member containing a recess therein for slidably and guidingly receiving the free end of the rod, a helical spring mounted over said rod and having the ends thereof in operative abutment with said member and said anvil to normally hold the anvil in said operative position, rotatably mounted anvil-actuating means operatively engageable with said plunger and said anvil and adapted to be actuated by the plunger at a predetermined point for retracting the anvil against the action of said spring; the plunger being adapted to drive the staple towards the material to cause it to strike the anvil while it is in its operative position, simultaneously causing the prongs to enter the material on either side of the anvil.

11. In a stapling machine, the combination of a plunger, means to reciprocally actuate the plunger for operative engagement with a suitably positioned staple, a retractible anvil adapted in its normal operative position to underlie the plunger and overlie the material being stapled, a rod attached to said anvil, a lug attached to the base of the machine and having a threaded hole therein, a screw in threaded engagement with said hole, the forward end of said screw containing a recess therein for slidably and guidingly receiving the free end of said rod, a helical spring mounted over said rod and having the ends thereof in operative abutment with said screw and said anvil to normally hold the anvil in said operative position, the screw being adapted for rotary manipulation to vary the tension in said spring, rotatably mounted anvil-actuating means operatively engageable with said plunger and said anvil and adapted to be actuated by the plunger at a predetermined point for retracting the anvil against the action of said spring; the plunger being adapted to drive the staple towards the material to cause it to strike the anvil while it is in its operative position, simultaneously causing the prongs to enter the material on either side of the anvil.

12. In a stapling machine, the combination of a plunger, means to reciprocally actuate the plunger for operative engagement with a suitably positioned staple, a retractible anvil adapted in its normal operative position to underlie the plunger and overlie the material being stapled, yieldable means in operative engagement with said anvil for normally holding it in its said operative position, a shaft extending transversely through the framework of said machine, two anvil actuators rotatably mounted on said shaft and operatively engageable with said plunger and said anvil and adapted to be actuated by the plunger at a predetermined point for retracting the anvil against the action of said yieldable means, a spiral spring attached to and wound over said shaft and positioned intermediate said anvil-actuators, said spring being connected to a suitable feed push member for actuating the staples towards said plunger, and two spacing members mounted over said shaft and positioned between said spring and said anvil-actuators.

13. In a stapling machine, the combination of a plunger, means to reciprocally actuate the plunger for operative engagement with a suitably positioned staple, a retractible anvil adapted in its normal operative position to underlie the plunger and overlie the material being stapled, rotatably mounted anvil-actuating means operatively engageable with said plunger and said anvil and adapted to be actuated by the plunger, and spring shock-absorbing means in operative engagement with said anvil to yieldably retard the plunger and take up its impact transmitted thereto through the anvil-actuating means and the anvil at the ultimate completion of the stroke, said spring means also yieldably holding said anvil in its said normal operative position.

14. In a stapling machine, a retractible anvil for supporting the driven staple and adapted in its normal operative position to overlie the material being stapled; said anvil containing a forwardly projecting lip for engagement with the staple, a body portion extending within the machine, and a base portion underlying the base of the machine, and in slidable engagement therewith; means associated with said body portion for slidably supporting the anvil within the machine, and means for reciprocally actuating said anvil to and from its said normal operative position.

15. In a stapling machine, a retractible anvil for supporting a driven staple and adapted in its normal operative position to overlie the material being stapled, and a housing for the anvil in and forming a part of the base of the machine; said anvil containing a forwardly projecting lip for engagement with the staple, a body portion extending within the housing, a base portion underlying the bottom of the housing and in slidable engagement therewith, and a pin extending transversely through said body portion; said housing containing in the bottom thereof a longitudinal slot for slidably accommodating said body portion of the anvil, the two lateral sides of the housing being slotted for slidably accommodating and supporting said pin; and means engageable with said pin for reciprocally actuating the anvil to and from its said normal operative position.

16. In a stapling machine, a longitudinally disposed rail for supporting and slidably accommodating a strip of staples; a retractible anvil for supporting a driven staple and adapted in its normal operative position to overlie the material being stapled; an anvil housing forming the forward portion of said rail; said housing having on the underside thereof a bottom longitudinal slot and in the lateral sides thereof two longitudinal side slots; said anvil comprising a forwardly projecting lip for engagement with the staple, a body portion extending within the housing and in slidable engagement with said bottom slot, a base portion underlying the bottom of the housing and in slidable engagement therewith, and a pin extending transversely through and projecting from the lateral sides of said body portion through said side slots for slidable engagement with the walls thereof and adapted to be supported thereby; spring means in operative engagement with the rear of said body portion of the anvil for yieldably holding it in its said normal position, and means coacting with the projecting portions of said pin for retracting the anvil against the action of said spring means.

17. In a stapling machine, the combination of a reciprocating plunger, a rail for supporting and slidably accommodating a strip of staples, means for feeding the staples towards the plunger, said rail being elevated at the rear thereof from the plane of the base of the machine, the path of action of the plunger forming a right angle with the rail and an obtuse angle with the said plane of the base; a front plate slidably and frictionally positioned adjacent the plunger and extending vertically along the entire front portion of the machine, a lip extending forwardly from said front plate and adapted for manual manipulation to move said plate vertically, said front plate being provided with an aperture having an expanded portion above the level of said rail and adapted to permit a staple to be withdrawn therethrough and a longitudinal slotted portion of reduced width extending downwardly therefrom; a base plate slidably positioned within the base of the machine and underlying said rail; and a knob adapted for manual grasping and positioned directly above and in line with the path of action of the plunger.

18. The combination of a plunger, means to reciprocally actuate the plunger to drive a staple positioned below said plunger and having two substantially arcuate prongs and a connecting portion with an indenture intermediate said prongs, an anvil having a portion containing an upper surface bevelled downwardly in a forwardly direction, said portion underlying said plunger and adapted to overlie the material being stapled; said plunger being adapted to drive the staple towards the material and cause said indenture to strike said upper surface of the anvil and to become flattened thereupon while the prongs of the staple are caused to enter the material.

19. The combination of a plunger, means to reciprocally actuate the plunger to drive a staple positioned below said plunger and having two substantially arcuate prongs and a connecting portion with an indenture intermediate the prongs, an anvil having a portion containing an upper surface convexly curved, said portion underlying said plunger and adapted to overlie the material being stapled; said plunger being adapted to drive the staple towards the material and cause said indenture to strike said upper surface of the anvil and to become flattened thereupon while the prongs of the staple are caused to enter the material.

20. The combination of a plunger, means to reciprocally actuate the plunger to drive a staple positioned below said plunger and having two substantially arcuate prongs and a connecting portion with an indenture intermediate said prongs, an anvil having a portion containing an upper surface bevelled downwardly in a forwardly direction, said anvil being movable between a normal operative and a retracted position, the said portion with the bevelled surface underlying said plunger in the operative position and being adapted to overlie the material being stapled; yieldable means engageable with said anvil for normally holding it in said operative position; the said plunger being adapted to drive the staple towards the material and cause said indenture to strike said upper surface of the anvil and the prongs of the staple to enter the material; the path of travel of the plunger making an obtuse angle with the forwardly part of said bevelled surface to cause a rearward retraction of the anvil against the action of the yieldable means.

21. In a stapling machine, a retractible anvil for supporting a driven staple, said anvil being positioned at the base of the machine and above the work being stapled, a plurality of props affixed to the base on either side of the anvil and adapted to rest upon the work, the height of the props being such as to enable the anvil to be operably movable at a level a predetermined distance above the work, the anvil being out of contact therewith.

22. In a stapling machine, a reciprocating plunger and locking means for holding the plunger against operative movement when the machine is out of engagement with the work to be stapled, said means comprising a recessed portion in a side of the plunger, a lock containing an element operatively engageable with said recessed portion, yieldable means in engagement with said lock to constantly actuate it towards its locking position, a vertical rod extending through and beyond the base of the machine, said rod being movable upwardly upon the engagement of the terminal portion thereof with the work when the machine is placed thereupon for operative manipulation, the upper portion of said rod being operatively engageable with said lock whereby said upward movement will cause a retraction of said lock from its locking engagement with the plunger against the action of said yieldable means.

23. In a stapling machine, the combination of a plunger, means to reciprocally actuate the plunger for operative engagement with a staple having substantially arcuate prongs and a connecting portion with an indenture intermediate the prongs, the base of the machine having an opening underlying the line of travel of the plunger and adapted to permit the plunger to project therethrough at the completion of its power stroke, a retractible anvil associated with the base and adapted in its operative position to extend across said opening and above the material being stapled, means coactively engageable with the anvil for moving it to and from said operative position, the plunger being adapted to drive the staple towards the material, while said anvil is in its said operative position, to cause the said indenture to strike the anvil and said connecting portion to become flattened thereupon, simultaneously causing the prongs to enter the material on either side of the anvil.

EMANUEL R. POSNACK.